Aug. 7, 1962
H. L. COONRADT ETAL  3,048,536
HYDROCRACKING PROCESS WITH REDUCTION IN AGING OF CATALYST BY
INTERMITTENT TREATMENT WITH HYDROGEN
Filed July 21, 1958
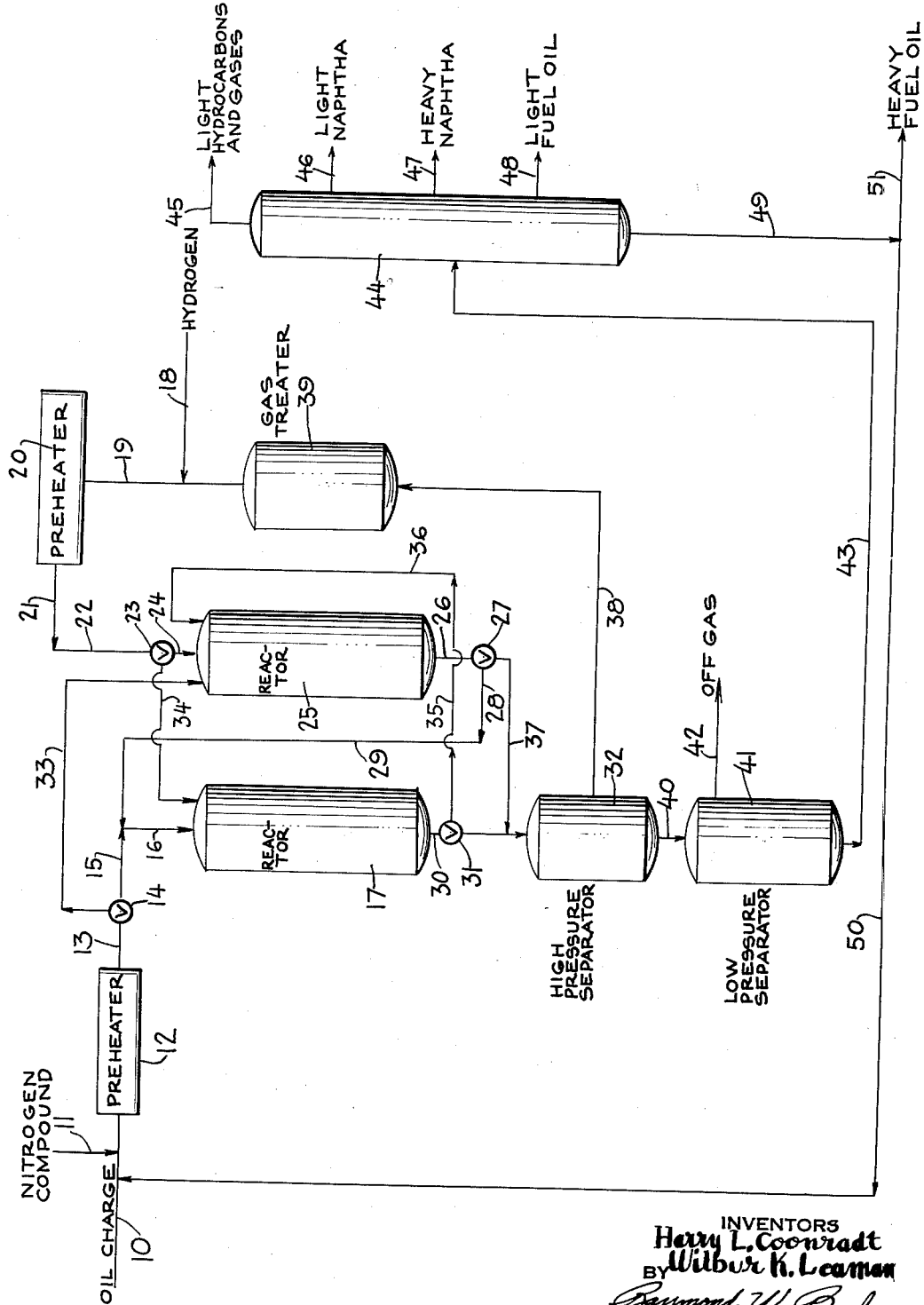
INVENTORS
Harry L. Coonradt
BY Wilbur K. Leaman
Raymond W. Barclay
ATTORNEY

United States Patent Office 3,048,536
Patented Aug. 7, 1962

3,048,536
HYDROCRACKING PROCESS WITH REDUCTION IN AGING OF CATALYST BY INTERMITTENT TREATMENT WITH HYDROGEN
Harry L. Coonradt, Woodbury, and Wilbur K. Leaman, Medford Lakes, N.J., assignors to Socony Mobil Oil Company, Inc., a corporation of New York
Filed July 21, 1958, Ser. No. 750,004
6 Claims. (Cl. 208—110)

This invention relates to a process for catalytically converting a high boiling petroleum fraction having a nitrogen content in the approximate range of 0.15 to 1 percent by weight into gasoline and fuel oil in the presence of hydrogen and a catalyst consisting essentially of a minor proportion of a metal of the platinum series, i.e. metals of the second and third transition series of group VIII, deposited on a suitable support. More particularly, the present invention is directed to a method for conducting such a process whereby the rate of decline in activity of the catalyst, i.e. the catalyst aging rate, is substantially decreased leading to an overall improved process in which the catalyst employed in effecting the desired conversion may be used over an extended period of time without the necessity of resorting to expensive regeneration or recovery of the valuable platinum series metal component of the catalyst.

It has heretofore been recognized in certain catalytic conversion processes, for example the hydrocracking of high boiling petroleum fractions, that it is highly desirable to have a degree of flexibility with respect to the temperature at which conversion is carried out. Such flexibility is desirable since allowances can then be made for changes in catalyst activity with time, with different charge stocks or with different product requirements. One method which has been used for securing the aforementioned desired flexibility in temperature has involved the addition of controlled quantities of nitrogen compounds to the hydrocarbon charge, for example, by blending high and low nitrogen content stocks or by recycling a nitrogen compound or its reaction product, such as ammonia. The presence of a small amount of nitrogen in the charge stock also has other definite advantages such as control of cetane and diesel indices of the fuel oil product, control of hydrogen consumption and regulation of the naphtha to fuel oil ratio. Thus, by way of example, if the diesel index of the fuel oil is higher than required, hydrogen consumption is greater than necessary. By adding a nitrogen compound, but keeping constant reaction conditions of pressure, hydrogen/oil ratio, and space velocity, the temperature required for a given conversion level is increased. Thereby, the amount of hydrogen required is substantially reduced. As will be realized, the cost of the hydrogen is a particularly expensive part of hydrocracking operations and any method which can be used to reduce the hydrogen requirement is highly desirable.

The introduction of nitrogen compounds in the charge stock to regulate reaction environment has however, in several instances, given rise to problems associated with an adverse catalyst aging rate. This, of course, affects catalyst life which can impose a serious economic burden on the process. In accordance with the present invention, there has now been discovered a unique method of utilizing nitrogen compounds to afford a degree of flexibility with respect to temperature required for hydrocracking operations, yet minimizing the catalyst aging which, as above noted, has heretofore presented a commercially significant problem.

Accordingly, it is an object of this invention to provide an improved process for cracking high boiling petroleum fractions containing at least about 0.15 weight percent nitrogen in the presence of hydrogen and a catalyst comprising a metal of the platinum series. Another object is to provide a method for reducing hydrogen consumption and achieving flexibility with respect to temperature at which hydrocracking of petroleum fractions is accomplished in the presence of hydrogen and a platinum metal catalyst by introducing a controlled amount of a nitrogen compound into the charge stock without the attendant disadvantage of adverse catalyst aging. A very important object of the present invention is to achieve the advantages attributable to a controlled nitrogen content in the charge stock employed in a hydrocracking operation in the presence of a catalyst comprising a metal of the platinum series while minimizing the aging rate of said catalyst.

The above and other objects which will be apparent to those skilled in the art are achieved in accordance with the process of the present invention. In general, the present invention provides, a process for converting a hydrocarbon oil fraction having a controlled nitrogen content of between about 0.15 percent and about 1 percent by weight and an initial boiling point of at least about 350° F., a 50 percent point of at least about 500° F. and an end boiling point of at least about 600° F. and boiling substantially continuously between said initial boiling point and said end boiling point into gasoline and fuel oil by contacting said hydrocarbon fraction with a catalyst consisting essentially of between about 0.05 percent and about 20 percent by weight of one or more of the metals of the platinum series deposited on a refractory acidic support in the presence of hydrogen in amounts expressed in molar ratio of hydrogen to hydrocarbon charge between about 2 and about 80, at pressures between about 100 and about 2500 p.s.i.g., at a liquid hourly space velocity between about 0.1 and 10 and at a temperature between about 600° F. and about 900° F. and periodically stopping contact between the catalyst and the oil charge for a short interval of time, but continuing passage of hydrogen rich gas over the catalyst under the aforesaid operating conditions of temperature and pressure.

It has been found that by employing such a hydrocyclic operation for hydrocracking in which the platinum metal catalyst is subjected to treatment with hydrogen in the absence of the nitrogen-containing petroleum charge stock at intervals of from about 10 seconds to 1 hour or more, the advantages attributable to the presence of nitrogen in the charge, namely a reduction in consumption of hydrogen and flexibility with respect to reaction temperature are retained while the adverse catalyst aging due to nitrogen presence is very substantially reduced.

There are various ways for effecting the desired hydrocyclic operation. Thus, one method is to maintain continuous circulation of a stream of hydrogen or hydrogen rich gas in contact with the catalyst and to inject vapors of the oil charge into this stream at chosen periodic intervals. Another procedure is to circulate finely divided catalyst continuously through the reaction zone and thereafter through an atmosphere of hydrogen at a rate selected to afford the desired interval of contact in each instance. Still another method is to charge hydrocarbon oil vapors and hydrogen and hydrogen alone alternately for such periods to the reaction zone.

In the hydrocracking of nitrogen-containing charge stocks in accordance with the present invention, it is generally preferred that the catalyst be treated with hydrogen at fairly frequent intervals. It will be understood, however, that the exact frequency with which the catalyst should be subjected to treatment with hydrogen in the absence of the oil charge depends on a number of factors such as the nature of the feedstock including the nitrogen content thereof, the character of the catalyst, temperature, pressure, feed rate, and other conditions of reaction. The repetitive periods of contact of the catalyst with oil and hydrogen followed by hydrogen alone, in general, take place under conditions such that the duration of each oil contact remains shorter than the pre-equilibrium period characteristic of the catalytic operation in the absenceof such cyclic operation. The cycle times for oil plus hydrogen and hydrogen alone may extend from about 10 seconds to about 6 hours. Under the usual contemplated conditions for hydrocracking described herein, the cycle times are more generally in the range of about 1 minute to about 45 minutes. The length of the "on oil" and "off oil" periods need not be identical. In this regard, the cycle involving treatment of the oil plus hydrogen may either be greater or less than the cycle involving treatment of the catalyst with hydrogen alone. Generally, the ratio of cycle time for oil plus hydrogen to the cycle time for hydrogen alone will be between 1:10 and 10:1.

The charge stocks employed in the present process are hydrocarbon fractions having an initial boiling point of at least about 350° F., a 50 percent point of at least about 500° F. and an end boiling point of at least about 600° F. and boiling substantially continuously between said initial boiling point and said end boiling point. Such charge stocks include gas oils, residual stocks, refractory cycle stocks from conventional cracking, and heavy hydrocarbon fractions derived by the destructive hydrogenation of coal, tars, pitches, asphalts, and the like. The distillation of higher boiling petroleum fractions, i.e. those boiling at temperatures higher than about 750° F. must be carried out under vacuum in order to avoid thermal cracking. As utilized herein, the boiling temperatures are expressed in terms of the boiling point at atmospheric pressure.

The term "gas oil" as utilized herein, unless further modified, includes any fraction distilled from petroleum which has an initial boiling point of at least about 350° F., a 50 percent point of at least about 500° F. and an end boiling point of at least about 600° F. and boiling substantially continuously between the initial boiling point and the end boiling point. The portion which is not distilled is considered residual stock. The exact boiling range of a gas oil therefore will be determined by the initial distillation temperature, the 50 percent point and the temperature at which distillation is cut off, i.e. the end boiling point. In practice, petroleum distillations have been carried out under vacuum up to temperatures as high as 1100–1200° F. (corrected to atmospheric pressure). Accordingly in the broad sense, a gas oil is a petroleum fraction which boils substantially continuously between two temperatures that establish a range of from about 350° F. to about 1100–1200° F. the 50 percent point being at least about 500° F.

A residual stock, as noted hereinabove, is any fraction which is not distilled. Therefore, any fraction regardless of its initial boiling point which includes all the heavy bottoms such as tars, asphalts, etc. is a residual fraction. Accordingly a residual stock can be the portion of the crude remaining undistilled at 1100 to 1200° F. or it can be made up of a gas oil fraction plus the portion undistilled at 1100 to 1200° F. The refractory cycle stocks are cuts of conventionally cracked stocks which boil above the gasoline boiling range usually between about 400° F. and about 850° F. The refractory cycle stocks can be charged to the process of this invention in conjunction with a fresh petroleum charge stock or they can be charged alone to the process.

The process of this invention is particularly concerned with hydrocracking of high boiling petroleum fractions having a controlled nitrogen content generally in the approximate range of 0.15 to 1 percent by weight. The particular nitrogen content of the charge within the above indicated range will depend on several factors. Thus, the amount of ammonia or other nitrogen compound can be varied not only with reaction conditions, type of catalyst and charge but also with conversion level and age of the catalyst. Control of nitrogen content generally can be effected in several ways or by a combination thereof. One method involves the addition of nitrogeneous compounds to the charge stock in amounts sufficient to achieve the desired total nitrogen content that will effect the desired degree of conversion at the operating temperature selected. In general, any nitrogen compound that is capable of being converted into ammonia at the reaction conditions used is applicable. Accordingly, the added compounds can be inorganic nitrogen compounds or they can be organic nitrogen compounds, such as amines, cyclic nitrogen materials, hydrazines and the like. Non-limiting examples of the nitrogen-containing compounds utilizable herein are ammonia, 2-methylpyridine, 2-methylpiperidine, pyrrole, pyrrolidine, quinoline, indole, acridine, and carbazole. Another source of added nitrogen is a gas oil, or other hydrocarbon fraction, that has a high nitrogen content, e.g. a California thermally cracked gas oil. It will be appreciated that the regulation of nitrogen content by means of added nitrogen compounds is more generally applicable to charge stocks that have a relatively low nitrogen content. In such a case, the amount of nitrogen compound added will be sufficient to bring the total nitrogen content up to the desired level. Another method of controlling the nitrogen content, more generally applicable in the case of charge stocks having large amounts of nitrogen, is by means of controlled reduction of the total nitrogen content of the charge. This reduction of nitrogen content can be effected by any of the several means well known to those skilled in the art. A particularly effective method is non-destructive hydrogenation to a degree just sufficient to effect the desired amount of nitrogen removal without materially affecting the other properties of the charge stock. A still further method of regulating the amount of nitrogen in the feed stock is by controlling the ammonia content of the hydrogen-containing recycle gas. Thus, a particularly suitable method of operation involves recycling a hydrogen rich gas containing nitrogen compounds, such as ammonia. This manner of operation permits ready control of the nitrogen charge level. For example ammonia may be partially removed from the recycle gas by appropriate scrubbers so that the desired nitrogen level may be obtained even with changing reaction conditions and charge stocks.

The hydrogen pressure used in the present process is between about 100 pounds per square inch gauge and about 2500 pounds per square inch gauge preferably between about 350 and about 2000 pounds per square inch gauge. The liquid hourly space velocity, i.e. the liquid volume of hydrocarbon per hour per volume of catalyst is generally between about 0.1 and about 10 and preferably between about 0.1 and 4. The molar ratio of hydrogen to hydrocarbon charge is within the approximate range of 2 to 80 and preferably between about 5 and about 50. The reaction temperature employed is generally between about 600° F. and about 900° F.

The carriers or supports for the catalyst employed in the process of this invention are synthetic composites of two or more refractory oxides which composites are acidic in nature. Generally, this group includes oxides of the metals of groups IIA, IIIB, IVA, and IVB of the periodic table. These synthetic composites of refractory oxides should have an activity index of at least about 25, as determined by the "CAT-A" test, which test has been described in National Petroleum News, 36, page R–537 (August 2, 1944). The synthetic composites of refractory oxides may also contain halogens and other materials which are known in the art as promoters for cracking catalysts. Non-limiting examples of the synthetically produced composites contemplated as catalyst carriers in the present process include silica-alumina, silica-zirconia, silica-alumina-zirconia, silica-alumina-thoria, alumina-boria, silica-magnesia, silica-alumina-magnesia, and silica-alumina-fluorine. A preferred support is a synthetic composite of silica and alumina containing between about 1 percent and about 75 percent by weight of alumina.

These synthetic composites of two or more refractory oxides may be produced by any of the usual methods well known to those familiar with the art of catalyst manufacture. Thus, considering the production of a silica-alumina composite as a representative example, such carrier may be prepared by adding an aqueous solution of a strong acid such as sulfuric, nitric or hydrochloric acid to an aqueous solution of sodium silicate to form a silica hydrogel. After the silica hydrogel is washed with water to remove sodium ions, it may be composited with a desired amount of purified alumina. The alumina can be prepared by adding ammonia or an alkali metal hydroxide to an aqueous solution of aluminum salt such as aluminum nitrate, aluminum sulfate or aluminum chloride. The carrier can also be prepared by dispersing silica hydrogel in an aqueous solution containing the required amount of a salt of aluminum and then adding sufficient aqueous ammonia to precipitate the alumina. The carrier or support can also be prepared by mixing a wet alumina hydrogel with a calcined silica to form an intimate mixture of the two components. Another method for preparing the carrier or support involves adding an aqueous acidic solution containing the required amount of aluminum salt to an aqueous solution of sodium silicate, thereby effecting cogelation of the silica and the alumina. The latter type of operation can be carried out in accordance with the method disclosed in U.S. 2,384,946 to produce the carrier in a bead form.

A typical method for preparing a halogen-containing carrier involves impregnating the synthetic oxide composite carrier with an aqueous solution of the corresponding ammonium halide such as for example ammonium chloride or ammonium fluoride. The thus impregnated carrier is then dried at about 1000° F. to decompose the ammonium halide with liberation of ammonia.

In some instances it may be desirable to reduce the activity index of the carrier from a relatively high value to a lesser value but not below 25. This can be accomplished by several methods, well known in the art. For example, it can be accomplished by steaming the carrier at temperatures of between 900° F. and about 1400° F. under steam pressures of between atmospheric and about 300 pounds per square inch gauge. Ordinarily, the time of treatment will be between about 50 hours and about 100 hours although longer or shorter periods can be used. In still another method, the carrier can be treated with water at 300 to 800° F. under pressures of 300 to 3000 pounds per square inch gauge for periods of time varying between about 1 and about 100 hours.

The amount of metal of the platinum series deposited on the carrier will be between about .05 percent and about 20 percent by weight of the final catalyst and preferably between about 0.1 percent and about 5 percent. The metals of the platinum series are those having atomic numbers of 44 to 46 inclusive and 76 to 78 inclusive, and include platinum, palladium, rhodium, osmium, iridium, and ruthenium. Platinum and palladium are particularly preferred. The metal deposited on the carrier can be a single metal of the platinum series or it can be a mixture or alloy of two or more such metals. Mixtures and alloys of other metals with metals of these series may also be used. The metal can be deposited upon the carrier in any suitable manner. A preferred method is to admix the synthetic oxide composite carrier with an aqueous solution of a halogen-containing acid of the desired metal, for example, chloroplatinic or chloropalladic acid or of ammoniacal solutions of these acids in such amounts that the liquid is substantially completely taken up by the carrier in a concentration to produce the desired amount of metal in the finished catalyst. The mixture is then aged in a closed vessel at temperatures generally between about 200 and about 250° F. for about 16 hours, treated with nitrogen at 450° F. during which drying takes place and thereafter treated with hydrogen at elevated temperatures generally about 400° F. to about 500° F. for about 2 to 4 hours and then heated for an additional 2 to 4 hours at a temperature in the approximate range of 900° to 1000° F. to reduce the chloride to the metal and to activate the catalyst.

The process of this invention may be carried out in any equipment suitable for carrying out catalytic operations. The process may be operated batchwise. It is preferable, however, and most feasible, to operate continuously. Accordingly, the process can involve a fixed bed of catalyst. It can be operated, however, using a moving bed of catalyst, wherein the hydrocarbon flow may be countercurrent or concurrent to the catalyst flow. A fluid type of operation can be used, wherein the catalyst is carried into the reactor in suspension in the hydrocarbon charge or fluidized with the hydrogen. A suitable method for carrying out the process of the invention is shown in the attached flow diagram designated as FIG. 1.

Referring more particularly to this figure, the oil charge is introduced through line 10. A small amount of a suitable nitrogen containing material sufficient to control the nitrogen content of the oil charge within the approximate range of 0.15 to 1 percent by weight may be introduced through line 11 to line 10. The nitrogen-containing charge is then conducted into preheater 12 maintained at a temperature of approximately 400 to 800° F. The preheated charge then passes through conduit 13 with valve 14 positioned to direct the flow of preheated charge through conduits 15 and 16 to reactor 17. Hydrogen is introduced through line 18, passes into conduit 19 through preheater 20 and thereafter through lines 21 and 22 with valve 23 positioned to direct the flow of preheated hydrogen through conduit 24 to reactor 25. Hydrogen flows downwardly through reactor 25 coming in contact with catalyst contained therein and then passes through line 26 with valve 27 positioned to direct the flow of hydrogen through conduits 28 and 29. Hydrogen and oil streams thus meet in conduit 16 before entering reactor 17. The reaction products leave reactor 17 through line 30 with valve 31 positioned to direct the flow of reaction products through conduit 31 to a high pressure separator 32. After reaction has taken place as described above in reactor 17 for a suitable interval of time, valve 14 is positioned to direct the flow of preheated charge through conduit 33 into reactor 25. At the same time, valve 23 is positioned to direct the flow of preheated stream of hydrogen and recycle gas through conduit 34 to reactor 17. Hydrogen and recycle gas pass through reactor 17 over the catalyst previously used for conversion and then through line 30 with valve 31 positioned to direct the flow of hydrogen and recycle gas through conduits 35 and 36 to reactor 25 where it comes into contact with the preheated oil charge. The reaction products leave reactor 25 and pass through line 26 with valve 27 positioned to direct the flow of reaction products through conduit 37 to high pressure separator 32. It will be understood that the respective alternate positioning of valve 14, 23, 27 and 31 takes place substantially simultaneously and preferably automatically at suitable periodic intervals responsive to a time control system not shown. In such manner, the catalyst contained in reactors 17 and 25 is subjected to alternate periodic contact with oil and hydrogen and with hydrogen alone.

A gas stream containing hydrogen, ammonia and other gases is removed through line 38 and passes to gas treater 39 where a portion of the ammonia may, if desired, be removed by scrubbing or other suitable means to the desired level. The remaining gas stream passes into conduit 19 and is recycled along with added hydrogen introduced through line 18. Liquid products are removed from the bottom of the high pressure separator through line 40 and conducted to a low pressure separator 41. Off gas is removed from the latter separator through outlet 42. The remaining liquid products are removed from the bottom of separator 41 through line 43 and conducted to fractionating column 44 wherein light hydrocarbons and gases are removed as overhead through outlet 45. Intermediate fractions of light naphtha, heavy naphtha and light fuel oil are withdrawn respectively from the fractionating column through lines 46, 47 and 48. Heavy fuel oil bottoms product is withdrawn through outlet 49. A portion of the heavy fuel oil product may, if desired, be recycled through line 50 to contact with the incoming oil charge in line 10. The remaining stream of heavy fuel oil is conducted to storage through line 51.

The following comparative examples will serve to illustrate the improvements achieved in accordance with the process of this invention without limiting the same:

EXAMPLE 1

Catalyst

A synthetic silica-alumina support containing 10 percent by weight alumina was prepared by mixing equal volumes of an aqueous solution of sodium silicate (containing 158 grams per liter of silica) with an aqueous acidic solution of aluminum sulfate containing 39.4 grams of $Al_2(SO_4)_3$ and 28.6 grams concentrated $H_2SO_4$ per liter. The resulting mixture was introduced in the form of globules into a column of oil, wherein gelation of the hydrogel was effected in bead form. The bead hydrogel particles were thereafter soaked in hot water (about 120° F.) for approximately 3 hours. The sodium in the hydrogel was then removed by base exchange with an aqueous solution of aluminum sulfate [1.5 percent $Al_2(SO_4)_3$ by weight] containing a small amount (0.2 percent by weight) of ammonium sulfate. The hydrogel beads were then water-washed free of soluble matter, dried in superheated steam at about 280 to 340° F. for about 3 hours and thereafter calcined at 1300° F. under a low partial pressure of steam for about 10 hours.

The silica-alumina beads obtained, having an activity index of 46, a surface area of 421 square meters per gram and containing about 10 percent by weight alumina and about 90 percent by weight silica, were crushed to a particle size of 14–25 mesh. The crushed material (196.7 grams) were evacuated and then contacted with 98 cc. of an aqueous solution of chloroplatinic acid containing 0.01 gram of platinum per cubic centimeter of solution. The resulting impregnated product was then aged in a lightly covered vessel at 230° F. for about 16 hours. It was then heated in nitrogen to 450° F., thereafter heated in hydrogen for 2 hours at 450° F. and finally heated in hydrogen for an additional 2 hours at 950° F. The resulting catalyst containing 0.52 weight percent platinum was characterized by a bulk density of 0.65 and a surface area of 388 square meters per gram.

Process

A Mid-Continent light gas oil was used as the charge stock and had the following properties:

| | |
|---|---|
| Gravity, ° API | 38.1 |
| Distillation, ASTM: | |
| I.B.P., ° F | 374 |
| 10% | 474 |
| 50% | 524 |
| 90% | 597 |
| E.P. | 662 |
| Wt. percent C | 86.50 |
| Wt. percent H | 13.60 |
| Wt. percent S | 0.25 |
| Wt. percent N | 0.005 |

The catalyst employed was that described hereinabove. A pressure of 1000 p.s.i.g. was used and the hydrogen rate was 18,900 s.c.f./b. The average catalyst temperature was 682° F. The liquid hourly space velocity was 0.5. No nitrogen was added to the charge and the oil was charged continuously. The conditions of this example, as will be noted, are essentially those of a conventional hydrocracking operation. This example may accordingly be considered as a blank for comparison with the results of the other examples set forth hereinbelow. The volume percent conversion to a 390° F. end point product was 48. The hydrogen consumption amounted to 890 s.c.f./b.

EXAMPLE 2

Catalyst

A catalyst of platinum on a silica-alumina support was prepared following the procedure described in Example 1. The resulting catalyst contained 0.49 weight percent platinum and was characterized by a bulk density of 0.63 and a surface area of 381 square meters per gram.

Process

The Mid-Continent light gas oil described in Example 1 was used. However, in this example 0.3 percent by weight nitrogen (as quinoline) was added to the charge stock. The catalyst employed was that described immediately above. A pressure of 1000 p.s.i.g. was used and the hydrogen rate was 18,900 s.c.f/b. The liquid hourly space velocity was 0.5. The temperature requirement increased about 100° F. as compared with Example 1, to 785° F. to maintain an approximately 48 volume percent conversion to a 390° F. end point product. The hydrogen consumption decreased, in comparison with Example 1 to 620 s.c.f./b. Under these conditions the catalyst aged at a rate of 3.0±0.3° F./day.

EXAMPLE 3

The catalyst and charge, including 0.3 percent by weight added nitrogen (as quinoline), was the same as that used in Example 2. The oil was charged on a cyclic basis, employing a 2 minute cycle time. That is to say, the oil charge and hydrogen were contacted with the catalyst for 2 minutes, after which the catalyst was contacted with hydrogen alone for 2 minutes. Contact of the oil charge and hydrogen with the catalyst was repeated for 2 minutes, followed by hydrogen alone for 2 minutes etc. Total oil throughput was maintained equivalent to that of Examples 1 and 2, by using a liquid hourly space velocity of 1.0. In this example, the hydrogen partial pressure during the 2 minutes that oil was pumped was kept the same as in the previous examples, i.e. the pressure was 1000 p.s.i.g. The same hydrogen flow rate was maintained during the 2 minute off oil cycle which resulted in a total hydrogen circulation of twice that used in the previous examples, i.e. a hydrogen rate of 37,800 s.c.f./b. In this example, the added nitrogen again gave the desired temperature increase, namely 763° F. as compared with 682° F. in Example 1. However, a three fold reduction in the catalyst aging rate was achieved. Instead of the catalyst aging at about 3° F./day as was shown to prevail previously (Example 2), this rate was reduced to about 1° F./day by employing a hydrocyclic operation in which short on-oil periods were followed by short periods when only gas flow continued.

EXAMPLE 4

The charge, catalyst, and reaction conditions were the same as those of Example 3, except that the total hydrogen circulation was maintained the same as in Examples 1 and 2. The temperature requirement was approximately the same as in Example 2 and about 100° F. higher than in Example 1. Once again, as observed in Example 3, the catalyst aging rate was reduced to one-third that experienced in Example 2 where oil was pumped continuously without taking advantage of the knowledge this invention teaches, namely that the use of nitrogen compounds can be employed to alter catalyst temperature requirements and yet minimize catalyst aging associated with such operation by alternately charging oil for a short period of time followed by a short interval when only a hydrogen rich gas is circulated to the reaction zone.

The results of the foregoing examples are summarized in Table I below:

TABLE I

| Ex. | Cycle Time | Charge Stock | Wt. Percent Nitrogen | Total H$_2$ Circ. s.c.f./b. | Vol. Percent Conv. to 390° F. E. P. Prod.[1] | Hydrogen Consumpt., s.c.f./b.[1] | Dry Gas, Wt. Percent | Fuel Oil Diesel Index[2] | Avg. Cat. Temp., ° F. | Catalyst Aging Rate |
|---|---|---|---|---|---|---|---|---|---|---|
| 1 | None | Mid-Cont. Lt. G.O. | 0.005 | 18,900 | 48.1 | 890 | 1.7 | 85.5 | 682 | |
| 2 | None | Mid-Cont. Lt. G.O. +Quinoline. | 0.33 | 18,900 | 48.6 | 620 | 2.1 | 73.3 | 785 | 3.0±0.3° F./D. |
| 3 | 2 min. | ___do___ | 0.30 | 37,800 | 49.5 | 800 | 1.9 | 80.2 | 763 | 1.0±0.2° F./D. |
| 4 | 2 min. | ___do___ | 0.33 | 18,900 | 50.5 | 640 | 2.2 | 74.3 | 786 | 0.9±0.1° F./D. |

[1] Conversion and yields expressed as net gas oil values, eliminating the products from the quioline.
[2] Diesel index on 390° F. + cycle stock.

It is to be noted from a comparison of Examples 1 and 2 of Table I that the addition or inclusion of nitrogen compounds in the processed charge stock decreased the consumption of hydrogen over 250 s.c.f./b. The presence of nitrogen in the charge stock, however, caused an increased rate in decline in activity of the catalyst. The disadvantage of increased catalyst aging is quite substantially overcome by combining this operation with a hydrocyclic operation in which oil plus hydrogen and hydrogen alone are alternately contacted at short intervals with the catalyst (Example 4). The hydrogen consumption here was also 250 s.c.f./b. lower than in Example 1. In Example 3, the total hydrogen circulation rate was twice as great as in the other examples, a factor which increased hydrogen consumption. However, even here, hydrogen consumption was substantially less than that of the base case (Example 1). The lower hydrogen consumption is in part achieved by reducing the degree of saturation of the product boiling above the naphtha region. Such is indicated by the diesel indices. However, even with this reduced hydrogen consumption, very high diesel indices, i.e. exceeding 70, were attained. It is of interest further to note that these results were attained without substantially changing the by-product yield of dry gas. It will be appreciated that with different charge stocks, reaction conditions, nitrogen level, etc. the reduction in hydrogen consumption and in catalyst aging rate would be subject to variation. The data set forth in Table I illustrate that a very substantial reduction in hydrogen consumption is effected by the process of this invention without the excessively high catalyst aging rate associated with nitrogen compounds.

Following the teachings of the invention, it has been found that the aging rate of the catalyst employed in hydrocracking the herein described nitrogen-containing charge stocks may be minimized by periodic withdrawal of the oil charge i.e., periodic hydrogen treatment at short intervals in the absence of the oil charge. Thus, it has been found that short alternate oil plus hydrogen cycles followed by hydrogen alone unexpectedly bring about a substantial reduction in the aging rate of the catalyst employed for conversion of the nitrogen-containing charge.

Without being limited by any theory, it is believed that the above-described periodic operation results in a condition where the catalyst never adsorbs or develops those chemical components which contribute to substantial catalyst aging to the same extent as would be the case without such cyclic hydrogen exposure during which redesorption of harmful components may occur. It is believed that the function of the frequent hydrogen treatment may be to remove from the charge components their lower molecular weight polymer or condensation products before they are converted to a type of coke which is not easily removable by hydrogen, and that such may account for the greatly improved stability of the present catalytic operation.

We claim:

1. A hydrocracking process which comprises adding to a hydrocracking charge stock a sufficient amount of a compound, selected from the group consisting of ammonia and a nitrogen compound decomposable to ammonia, under the process temperature conditions to adjust the nitrogen content of said charge stock within the approximate range of 0.15 to 1 percent by weight, contacting said nitrogen-containing charge stock with a catalyst consisting essentially of a minor proportion of a metal of the platinum series deposited on an acidic refractory oxide support in the presence of hydrogen under conditions of temperature and pressure capable of effecting, under continuous conditions of contact, rapid aging of said catalyst with reduction in activity thereof and periodically interrupting contact between said catalyst and said charge stock at intervals of from about 1 minute to about 45 minutes while maintaining continuous contact of said catalyst with hydrogen whereby a substantial decrease in the rate of aging of said catalyst is achieved.

2. A process for hydrocracking a hydrocarbon fraction having an initial boiling point of at least about 350° F., a 50 percent point of at least about 500° F. and an end point of at least about 600° F. and boiling substantially continuously between said initial boiling point and said end boiling point into a lower boiling hydrocarbon product which comprises controlling the nitrogen content of said hydrocarbon fraction to within the approximate range of 0.15 to 1 percent by weight, contacting said nitrogen-containing hydrocarbon fraction with a catalyst consisting essentially of between about 0.05 percent and about 20 percent by weight of the catalyst of at least one metal of the platinum series deposited on a synthetic composite of solid oxides of at least two elements of groups IIA, IIIB, and IV of the periodic table, in the presence of hydrogen in amounts, expressed in the molar ratio of hydrogen to hydrocarbon charge of between about 2 and about 80, at a pressure between about 100 p.s.i.g. and about 2500 p.s.i.g., at a liquid hourly space velocity of between 0.1 and 10 and at a temperature between about 600° F. and about 900° F. and periodically interrupting contact between said catalyst and said hydrocarbon fraction at intervals of from about 10 seconds to about 6 hours while maintaining continuous contact of said catalyst with hydrogen under the aforesaid operating conditions of temperature and pressure, whereby a substantial decrease in the rate of decline of hydrocracking activity of said catalyst is realized.

3. A process for hydrocracking a hydrocarbon fraction having an initial boiling point of at least about 350° F., a 50 percent point of at least about 500° F., and an end point of at least about 600° F. and boiling substantially continuously between said initial boiling point and said end boiling point into a lower boiling hydrocarbon product which comprises controlling the nitrogen content of said hydrocarbon fraction to within the approximate range of 0.15 to 1 percent by weight, contacting said nitrogen-containing hydrocarbon fraction with a catalyst consisting essentially of between about 0.1 percent and about 5 percent by weight of the catalyst of at least one metal of the platinum series deposited on a synthetic composite or solid oxides of at least two elements of groups IIA, IIIB, and IV of the periodic table, in the presence of hydrogen in amounts expressed in the molar ratio of hydrogen to hydrocarbon charge of between about 5 and about 50, at a pressure between about 350 p.s.i.g. and about 2000 p.s.i.g., at a liquid hourly space velocity of between 0.1 and 4 and at a temperature between about 600° F. and about 900° F. and periodically stopping contact between said catalyst and said hydrocarbon fraction at intervals of from about 1 minute to about 45 minutes while continuing passage of hydrogen gas over the catalyst under the aforesaid operating conditions of temperature and pressure, whereby a substantial decrease in the rate of decline of hydrocracking activity of said catalyst is obtained.

4. A hydrocracking process which comprises adding to a hydrocarbon fraction boiling in the gas oil range, a sufficient amount of a compound selected from the group consisting of ammonia and a nitrogen compound decomposable to ammonia under the process temperature conditions to adjust the nitrogen content of said hydrocarbon fraction within the approximate range of 0.15 to 1 percent by weight, contacting said nitrogen-containing hydrocarbon fraction with a catalyst consisting essentially of a minor proportion of a metal of the platinum series deposited on an acidic refractory oxide support in the presence of hydrogen in amounts expressed in the molar ratio of hydrogen to hydrocarbon charge of between about 2 and about 80, at a pressure between about 100 p.s.i.g. and about 2500 p.s.i.g., at a liquid hourly space velocity of between 0.1 and 10 and at a temperature between about 600° F. and about 900° F. and periodically interrupting contact between said catalyst and said hydrocarbon fraction at intervals of from about 10 seconds to about 6 hours while maintaining continuous contact of said catalyst with hydrogen under the aforesaid operating conditions of temperature and pressure, collecting the products of said hydrocarbon conversion, separating ammonia therefrom and recycling said recovered ammonia to contact with the initial hydrocarbon charge.

5. A process for hydrocracking a hydrocarbon fraction having an initial boiling point of at least about 350° F., a 50 percent point of at least about 500° F. and an end point of at least about 600° F. and boiling substantially continuously between said initial boiling point and said end boiling point into a lower boiling hydrocarbon product which comprises controlling the nitrogen content of said hydrocarbon fraction to within the approximate range of 0.15 to 1 percent by weight, contacting said nitrogen-containing hydrocarbon fraction with a catalyst consisting essentially of between about 0.05 percent and about 20 percent by weight of platinum deposited on a synthetic silica-alumina composite in the presence of hydrogen in amounts expressed in the molar ratio of hydrogen to hydrocarbon charge of between about 2 and about 80 at a pressure between about 100 p.s.i.g. and about 2500 p.s.i.g., at a liquid hourly space velocity of between 0.1 and 10 and at a temperature of between about 600° F. and about 900° F. and periodically interrupting contact between said catalyst and said hydrocarbon fraction at intervals of from about 10 seconds to about 6 hours while maintaining continuous contact of said catalyst with hydrogen under the aforesaid operating conditions of temperature and pressure whereby a substantial decrease in the rate of decline of hydrocracking activity of said catalyst is obtained.

6. A process for hydrocracking a hydrocarbon fraction having an initial boiling point of at least about 350° F., a 50 percent point of at least about 500° F., and an end point of at least about 600° F. and boiling substantially continuously between said initial boiling point and said end boiling point which comprises controlling the nitrogen content of said hydrocarbon fraction to within the approximate range of 0.15 to 1 percent by weight, contacting said nitrogen-containing hydrocarbon fraction with a catalyst consisting essentially of between about 0.1 and about 5 percent by weight of platinum deposited on a synthetic silica-alumina composite in the presence of hydrogen in amounts expressed in the molar ratio of hydrogen to hydrocarbon charge of between about 5 and about 50, at a pressure between about 350 p.s.i.g. and about 2000 p.s.i.g. at a liquid hourly space velocity of between 0.1 and 4 and at a temperature between about 600° F. and about 900° F. and periodically interrupting contact between said catalyst and said hydrocarbon fraction at intervals of from about 1 minute to about 45 minutes while maintaining continuous contact of said catalyst with hydrogen under the aforesaid operating conditions of temperature and pressure whereby a substantial decrease in the rate of decline of hydrocracking activity of said catalyst is obtained.

References Cited in the file of this patent
UNITED STATES PATENTS

| 2,472,844 | Munday et al. | June 14, 1949 |
| 2,744,053 | Kay et al. | May 1, 1956 |
| 2,764,528 | Sweeney | Sept. 25, 1956 |
| 2,768,936 | Anderson et al. | Oct. 30, 1956 |
| 2,816,857 | Hemminger | Dec. 7, 1957 |
| 2,911,356 | Hanson | Nov. 3, 1959 |